US006956855B1

(12) United States Patent
Chang

(10) Patent No.: US 6,956,855 B1
(45) Date of Patent: Oct. 18, 2005

(54) APPARATUS AND METHOD FOR RETRANSMITTING DATA ACCORDING TO RADIO LINK PROTOCOL IN MOBILE COMMUNICATION SYSTEM

(75) Inventor: Hoon Chang, Seoul (KR)

(73) Assignee: Samsung Electronics Co., Ltd., (KR)

( * ) Notice: Subject to any disclaimer, the term of this patent is extended or adjusted under 35 U.S.C. 154(b) by 775 days.

(21) Appl. No.: 09/631,242

(22) Filed: Aug. 2, 2000

(30) Foreign Application Priority Data

Aug. 2, 1999 (KR) .................................. 99-31753

(51) Int. Cl.⁷ ........................................... H04L 12/28
(52) U.S. Cl. ..................... 370/394; 370/252; 370/410
(58) Field of Search ................... 370/428, 394, 370/338, 337, 335, 336, 242, 252, 410; 714/748, 714/749, 746, 750; 371/32; 709/230

(56) References Cited

U.S. PATENT DOCUMENTS

| 5,610,595 | A   |   | 3/1997  | Garrabrant et al.             |
|-----------|-----|---|---------|-------------------------------|
| 5,701,312 | A   |   | 12/1997 | DeLuca et al. ......... 371/32 |
| 5,727,002 | A   |   | 3/1998  | Miller et al.                 |
| 5,729,541 | A   |   | 3/1998  | Hamalainen et al.             |
| 6,011,796 | A   | * | 1/2000  | Rezaiifar et al. ...... 370/394 |
| 6,021,124 | A   |   | 2/2000  | Haartsen ............... 370/336 |
| 6,169,732 | B1  | * | 1/2001  | Hetherington et al. ... 370/335 |
| 6,487,201 | B1  | * | 11/2002 | Seo ..................... 370/394 |
| 6,496,481 | B1  | * | 12/2002 | Wu et al. .............. 370/242 |
| 6,567,388 | B1  | * | 5/2003  | Tomcik et al. ......... 370/335 |
| 6,581,176 | B1  | * | 6/2003  | Seo ..................... 714/749 |
| 6,772,215 | B1  | * | 8/2004  | Schön et al. .......... 709/230 |

FOREIGN PATENT DOCUMENTS

| RU | 2127953     | 3/1999  |
|----|-------------|---------|
| WO | WO 96/33586 | 10/1996 |
| WO | WO 98/58469 | 12/1998 |

OTHER PUBLICATIONS

William Stallings, Data and Computer Communications, Second Edition, Macmillan Publishing Company, pp. 141-144.*
Russian Office Action issued in a counterpart application, namely, Appln. No. 2002102704/09.
Australian Office Action dated Aug. 28, 2002 issued in a counterpart application, namely Appln. No. 61883/00.

* cited by examiner

Primary Examiner—Phirin Sam
Assistant Examiner—Robert W. Wilson
(74) Attorney, Agent, or Firm—Dilworth & Barrese LLP

(57) ABSTRACT

There are provided an apparatus and method for retransmitting data according to a radio link protocol in a mobile communication system. In the method of requesting frame retransmission, a receiver stores the sequence numbers of a plurality of RLP (Radio Link Protocol) frames that are not received from a transmitter and transmits a retransmission request frame including fields that indicate the sequence numbers. Then, the transmitter sequentially transmits the requested RLP frames in the order of the sequence numbers to the receiver. The receiver compares the stored sequence numbers with the sequence numbers of received RLP frames and if it receiver fails to receive one of the requested RLP frames, the receiver requests retransmission of the lost RLP frame upon receipt of an RLP frame of a higher sequence number than the sequence number of the lost RLP frame.

3 Claims, 10 Drawing Sheets

SYNC, SYNC/ACK, ACK FRAME

CTL='1101 1000' for SYNC, '1110 1000' for ACK, '1111 1000' for SYNC/ACK

FUNDAMENTAL/DEDICATED DATA FRAME

CTL='0', P(PADDING)

CTL='10000', P(PADDING)

TYPE='10' or '11', P(PADDING)

TYPE='00', P(PADDING)

IDLE/INTERSEGMENT FILL FRAME

CTL='1001' or '1010'

SUPPLEMENTAL DATA FRAME (a) TYPE='10' or '11'

(b) TYPE='01', CTL="00"

US 6,956,855 B1

APPARATUS AND METHOD FOR RETRANSMITTING DATA ACCORDING TO RADIO LINK PROTOCOL IN MOBILE COMMUNICATION SYSTEM

This application claims priority to an application entitled "Apparatus and Method for Retransmitting Data according to Radio Link Protocol in Mobile Communication System" filed in the Korean Industrial Property Office on Aug. 2, 1999 and assigned Serial No. 99-31753, the contents of which are hereby incorporated by reference.

BACKGROUND OF THE INVENTION

1. Field of the Invention

The present invention relates generally to a CDMA (Code Division Multiple Access) mobile communication system, and in particular, to an apparatus and method for rapidly retransmitting frames that are lost during data transmission/reception according to a radio link protocol (RLP) used for efficient data transmission in a radio environment.

2. Description of the Related Art

CDMA has evolved from the IS-95 standards that provide primarily voice transmission service to CDMA 2000 standards that can provide the additional services of high quality voice transmission, moving picture transmission, and Internet browsing.

Packet data service in CDMA 2000 is illustrated in FIG. 1. In FIG. 1, a terminal is comprised of a terminal equipment TE and a mobile termination MT. BS/MSC denotes a base station/mobile switching center and IWF denotes an interworking function (IWF) unit that interworks with a data network (e.g., Internet). The IWF unit serves to convert protocols when different protocols are used. Upper service (web service) processors of the terminal and the IWF unit communicate data through an Internet protocol (IP) processor and a point-to-point protocol (PPP) processor. That is, the upper service processors transfer data in link protocol packets to lower layers and the lower layers transmit the received data by appropriate protocols.

In FIG. 1, an EIA-232 controller is used between the TE and the MT by way of example. Link protocol packets received at the MT through the EIA-232 controller become RLP frames according to the RLP, which the present invention is directed to. The RLP frames are transmitted over a physical channel connected by the CDMA 2000 standards, namely IS-2000 standards. The RLP packets received at the base station over the physical channel are recovered to the link protocol packets, which are transmitted to the IWF unit through relay layers. The interface between the base station and the IWF unit is generally based on IS-658 standards. The IWF unit takes out data from the link protocol packets and transmits them to a network protocol processor and finally to the upper service processors.

The procedure describes data transmission from the terminal to the base station and data transmission from the base station to the terminal is performed similarly.

Different configurations from that shown in FIG. 1 can be contemplated to provide various services in CDMA 2000. However, they are the same in that link protocol packets including web service data are transmitted over a physical channel by RLP.

FIG. 2 is a detailed block diagram of a mobile communication system for transmitting/receiving data according to the RLP of FIG. 1.

Referring to FIG. 2, transmission data buffers 122 and 222 and reception data buffers 124 and 224, being memory devices, store data that EIA-232 controllers or IS-658 controllers received from link protocol processors 110 and 210. RLP processors 130 and 230 receive a necessary amount of data from the data buffers 122 and 222 and transmit them to their receiving sides. The RLP processors 130 and 230 store the received data in the data buffers 124 and 224. The EIA-232 controllers or the IS-658 controllers transmit the stored data to PPP processors, that is, the link protocol processors 110 and 210. The EIA-232 controllers and the IS-658 controllers operate based on the EIA-232 standards and the IS-658 standards, respectively. These controllers are not shown in FIG. 2 because the current CDMA 2000 packet service allows other schemes as well as the EIA-232 and IS-658 controllers.

Multiplexing/demultiplexing (MUX/DEMUX) controllers 140 and 240 attach information about the destinations and sizes of RLP frames and transmit the RLP frames to physical layer processors 150 and 250. The MUX/DEMUX controllers 140 and 240 also check the destinations and sizes of received RLP frames and transmit the RLP frames to the RLP processors 130 and 230.

The physical layer processors 150 and 250 connect physical channels between the terminal and the base station according to the IS-2000 standards, transmit information received from the MUX/DEMUX controllers 140 and 240 over the physical channels, and transmit information received over the physical channels to the MUX/DEMUX controllers 140 and 240.

According to the RLP type 3 standard, if received frames are defective, a frame retransmission request is transmitted to an RLP frame transmitter. That is, an RLP frame receiver transmits a NAK (Non-Acknowledgment) frame including a retransmission request for a specific frame to the RLP frame transmitter and then the RLP frame transmitter retransmits the frame. The NAK frame and the retransmitted frame might also be damaged. Hence, the RLP frame receiver retransmits the NAK frame if it fails to receive the requested frame within a predetermined time period. After transmitting the NAK frame, the RLP frame receiver sets a retransmission timer to an appropriate value and retransmits the NAK frame if it cannot receive the requested frame until the retransmission timer value is decreased one by one and finally to 0.

The retransmission timer value is decreased if the RLP frame receiver receives a null frame, an idle frame, or a new data frame. The RLP frame transmitter transmits a null frame or an idle frame when it has no data to transmit or no retransmission requests to process. The RLP frame transmitter transmits a new data frame when it has data to transmit but no retransmission requests to process. Receipt of such frames at the RLP frame receiver implies that the RLP frame transmitter has received no retransmission request. Therefore, the RLP frame receiver decreases the retransmission timer value.

However, if the RLP frame transmitter has too many frames to retransmit, it cannot transmit a null frame, an idle frame, or a new data frame until it finishes retransmitting the frames. Consequently, in case some retransmitted frames are lost again, the RLP frame receiver does not transmit a retransmission request until it receives a null frame, an idle frame, or a new data frame.

FIG. 3 is a view illustrating a conventional frame retransmission request and retransmission procedure. Here, two time slots (i.e., 40 ms) are occupied for requesting retransmission by the RLP frame receiver and then retransmitting a requested frame by the RLP frame transmitter, by way of example. While a retransmission timer is set for each retransmission frame according to the RLP Type 3 standard, only the case that frame #1 is damaged during retransmission will be considered here.

In FIG. 3, the RLP frame receiver recognizes at time T1 that frames #0 to #5 have been damaged and transmits an NAK frame, setting a retransmission timer for frame #1 to two time slots. The RLP frame transmitter retransmits the requested frames at time T2. The RLP frame receiver receives none of the requested frames at time T3 and thus decreases the retransmission timer value by 1. At time T4, the RLP frame receiver receives frame #0 and need not decrease the retransmission timer value because the RLP frame receiver has received no null frames, idle frames, or new data frames. When frame #1 is damaged at time T5, the RLP frame receiver does not decrease the retransmission timer value for the above-described reason. The RLP frame receiver does not decrease the retransmission timer value at time T6 either because it receives frame #2.

As noted from FIG. 3, according to the current RLP Type 3 standard, retransmission of frame #1 that is lost again cannot be requested until the last frame #5 is retransmitted. In case too many frames are to be retransmitted, the retransmission request is much delayed. Thus, an upper link protocol controller performs retransmission, thereby decreasing the whole performance.

The reason that the RLP Type 3 standard sets the above timer decrease conditions is that the RLP frame transmitter processes retransmission requests in the received order. Although the RLP frame receiver requests for retransmission of frame #1 at T6, the RLP frame transmitter processes the retransmission request received at T2 for frames #0 to #5 prior to processing of the retransmission request for frame #1 received later than T6. Therefore, arrival of retransmission frames in the order of their sequence numbers is not guaranteed. As a result, the RLP frame receiver cannot recognize that a specific frame has not been received until the RLP frame transmitter finishes transmitting all the retransmission frames.

SUMMARY OF THE INVENTION

It is, therefore, an object of the present invention to provide an apparatus and method for transmitting/receiving RLP data in a new RLP frame retransmitting scheme other than the RLP Type 3 scheme.

It is another object of the present invention to provide an apparatus and method for transmitting/receiving RLP data, in which an RLP frame transmitter transmits retransmission frames in the order of their frame sequence numbers in order to reduce stand-by time at an RLP frame receiver and thus increase data transmission efficiency.

It is a further object of the present invention to provide an apparatus and method for transmitting/receiving RLP data, in which an RLP frame receiver can request retransmission more rapidly by decreasing a retransmission timer value in a new manner.

It is still another object of the present invention to provide an apparatus and method for transmitting/receiving RLP data, in which an RLP frame transmitter determines transmission priority of retransmission frames according to their sequence numbers and an RLP frame receiver decreases a retransmission timer value based on the sequence numbers of the received frames.

The above objects can be achieved by providing an apparatus and method for retransmitting data according to a radio link protocol in a mobile communication system. In the method of requesting frame retransmission, a receiver stores the sequence numbers of a plurality of RLP frames that are not received from a transmitter and transmits a retransmission request frame including fields that indicate the sequence numbers. Then, the transmitter sequentially transmits the requested RLP frames in the order of the sequence numbers to the receiver. The receiver compares the stored sequence numbers with the sequence numbers of received RLP frames and if it receiver fails to receive one of the requested RLP frames, the receiver requests retransmission of the lost RLP frame upon receipt of an RLP frame of a higher sequence number than the sequence number of the lost RLP frame.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention is directed to an apparatus and method for requesting RLP frame retransmission and retransmitting requested frames in a new method other than the RLP Type 3 method. AN RLP frame transmitter transmits retransmission frames in the order of their sequence numbers so that a frame that should arrive at the RLP frame receiver in the first place can be transmitted earlier than the others. Consequently, time required for the RLP frame receiver to receive frames with lower sequence numbers later than frames with higher sequence numbers is reduced, thereby increasing data transmission performance. Since the RLP frame transmitter always transmits retransmission frames in the order of their sequence numbers, the RLP frame receiver can decrease a retransmission timer value at an optimal time point and thus transmit a retransmission request more rapidly.

According to a frame retransmitting method in the RLP frame transmitter that the present invention suggests, the priority of retransmission frames are determined and the frames are retransmitted according to the determined priority. The priority can be determined based on sequence numbers. Since the RLP frame receiver should receive a frame with the lowest sequence number earlier than the other frames, the highest priority is given to the frame with the lowest sequence number.

According to a retransmission timer value decreasing method in the RLP frame receiver that the present invention suggests, the highest of the sequence numbers of frames received in one time slot is stored and retransmission timer values for frames with lower sequence numbers are decreased by one. Since all retransmission frames are transmitted in the order of their sequence numbers, arrival of a frame with a higher sequence number than intended implies that a retransmission request for an awaited frame has not reached the RLP frame transmitter or the awaited frame has been lost during transmission.

Figure 1:
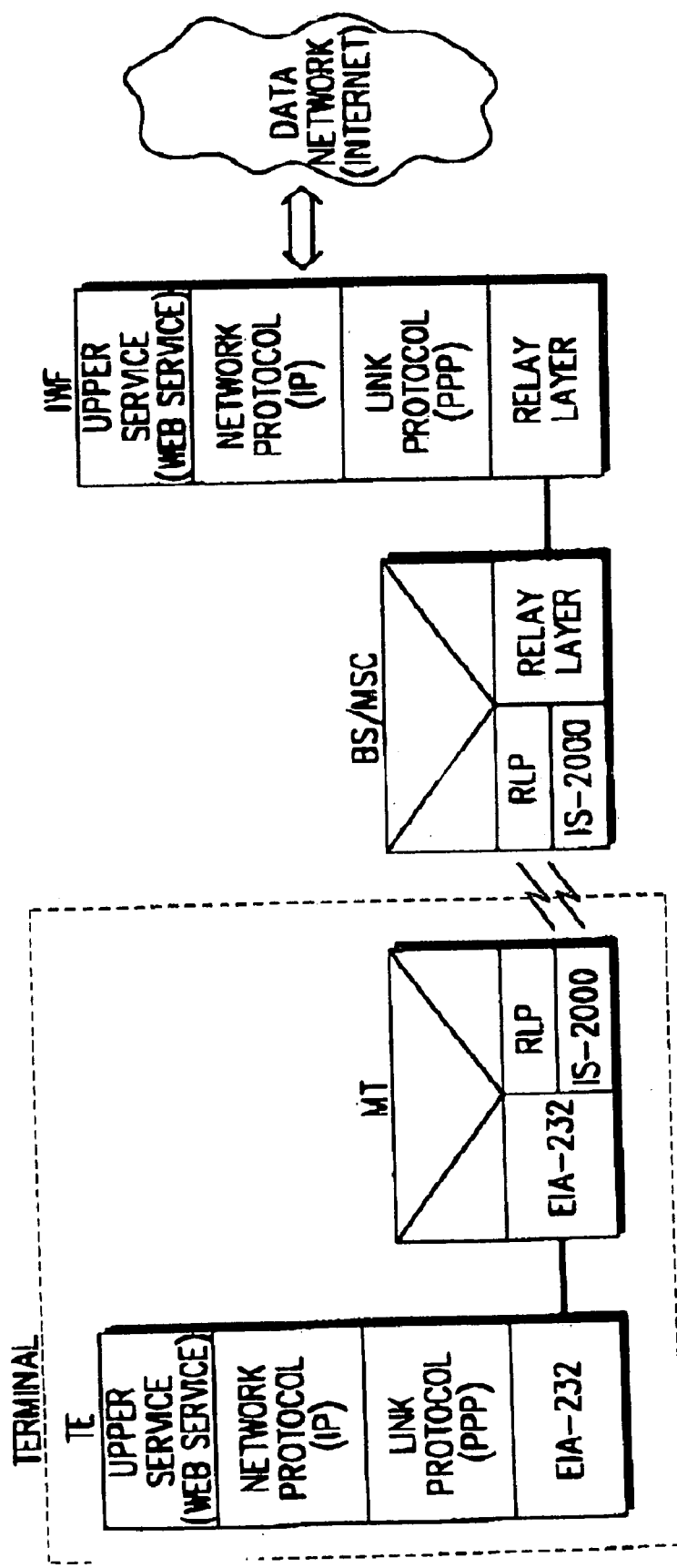
FIG. 1 illustrates the configuration of a general CDMA communication system for packet data service.
Figure 2:
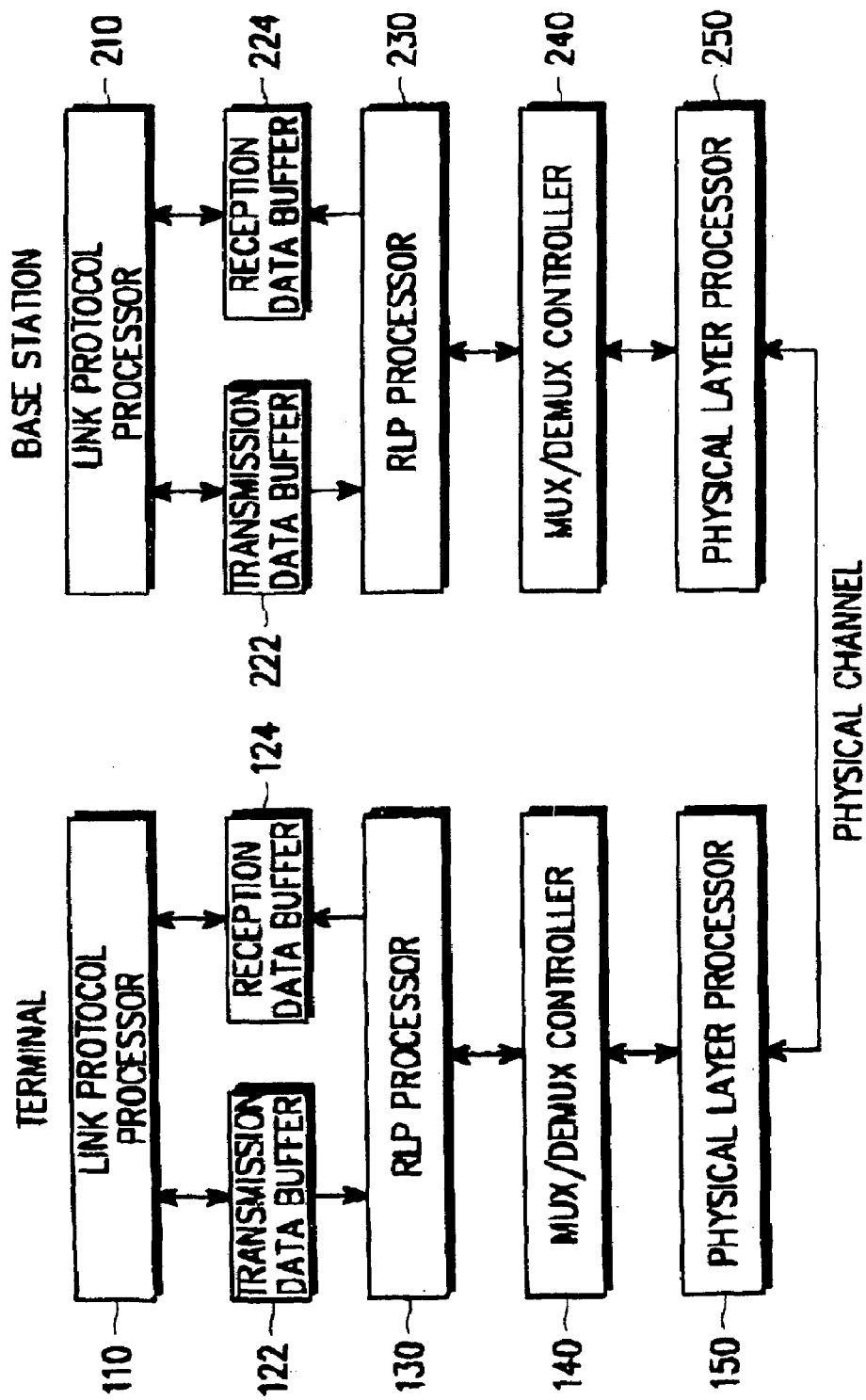
FIG. 2 is a block diagram of an RLP-based data transmitting/receiver to which the present invention is applied.
Figure 3:
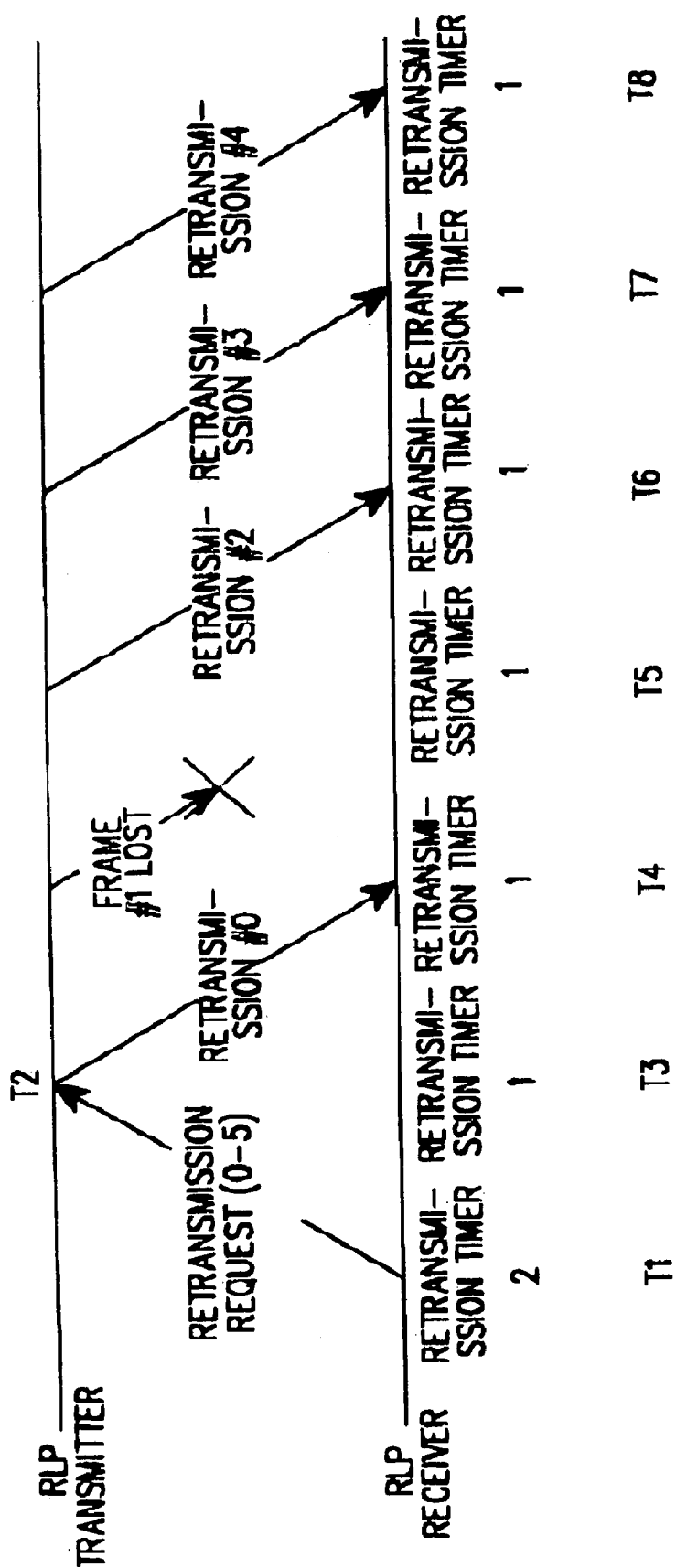
FIG. 3 illustrates a conventional frame retransmission procedure.
Figure 4:
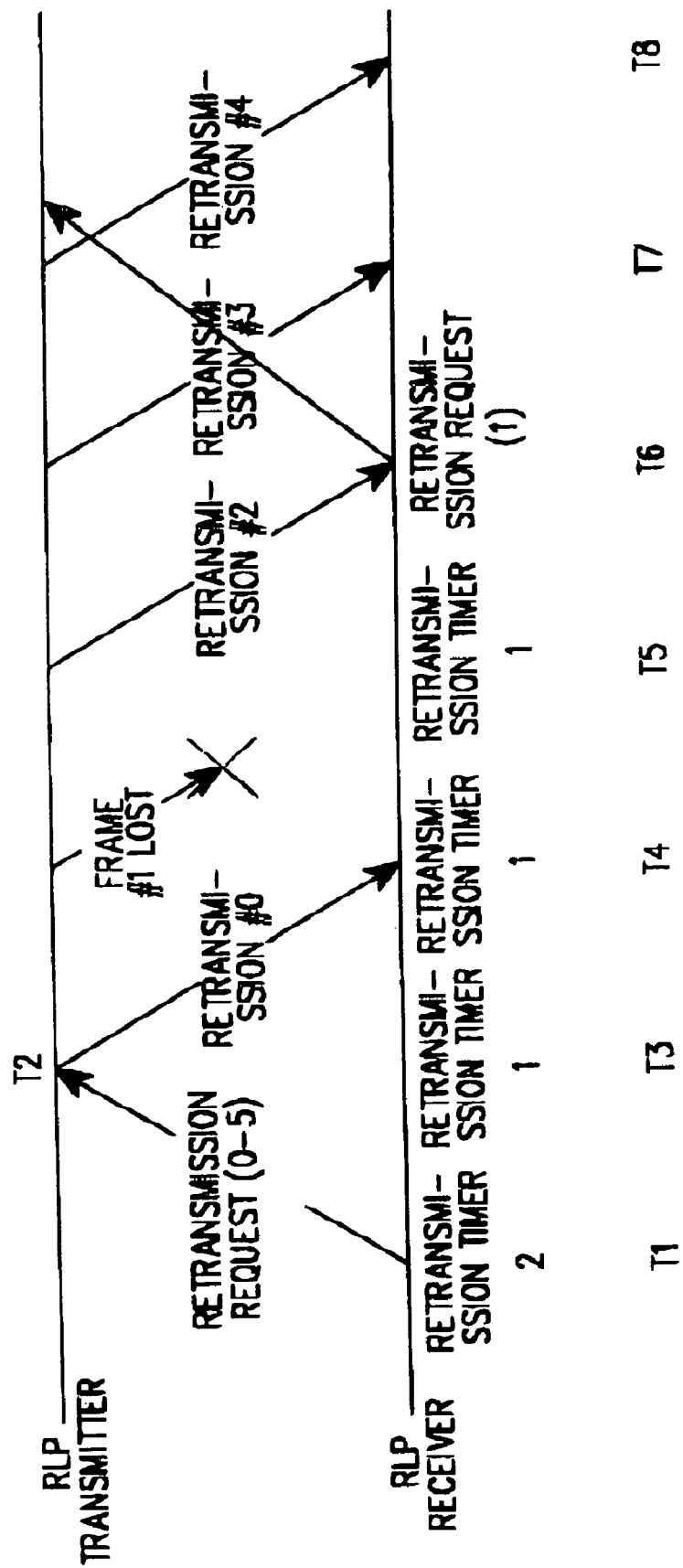
FIG. 4 illustrates a frame retransmission procedure according to the present invention.

FIG. 4 illustrates a retransmission procedure according to the present invention. Here, it is assumed that frame #1 is damaged during retransmission and only a retransmission timer for frame #1 is considered.

Referring to FIG. 4, the RLP frame receiver recognizes that frames #0 to #5 are damaged and transmits an NAK frame to the RLP frame transmitter, setting a retransmission timer for frame #1 to two time slots, at T1. The RLP frame transmitter arranges the requested retransmission frames in due order and begins to transmit the frames at T2. The RLP frame receiver decreases the retransmission timer value by 1, that is, to "1" at T3 because no frames have arrived. Upon receipt of frame #0 at T4, the RLP frame receiver does not decrease the retransmission timer value because the sequence number of the received frame is less than that of frame #1. Although frame #1 is damaged during retransmission at T5, the RLP frame receiver does not decrease the retransmission timer value because it does not know which frame has been damaged. Upon receipt of frame #2 at T6, which implies that frame #1 has already been transmitted from the RLP frame transmitter, the RLP frame receiver decreases the retransmission timer value to 0 and thus transmits a retransmission request for frame #1 to the RLP frame transmitter.

As noted from FIG. 4, the retransmission request for frame #1 can be transmitted shortly after frame #2 is received in the present invention. A retransmission request can be generated even in the case that there are many retransmission frames, thereby increasing the whole performance.

Figure 5:
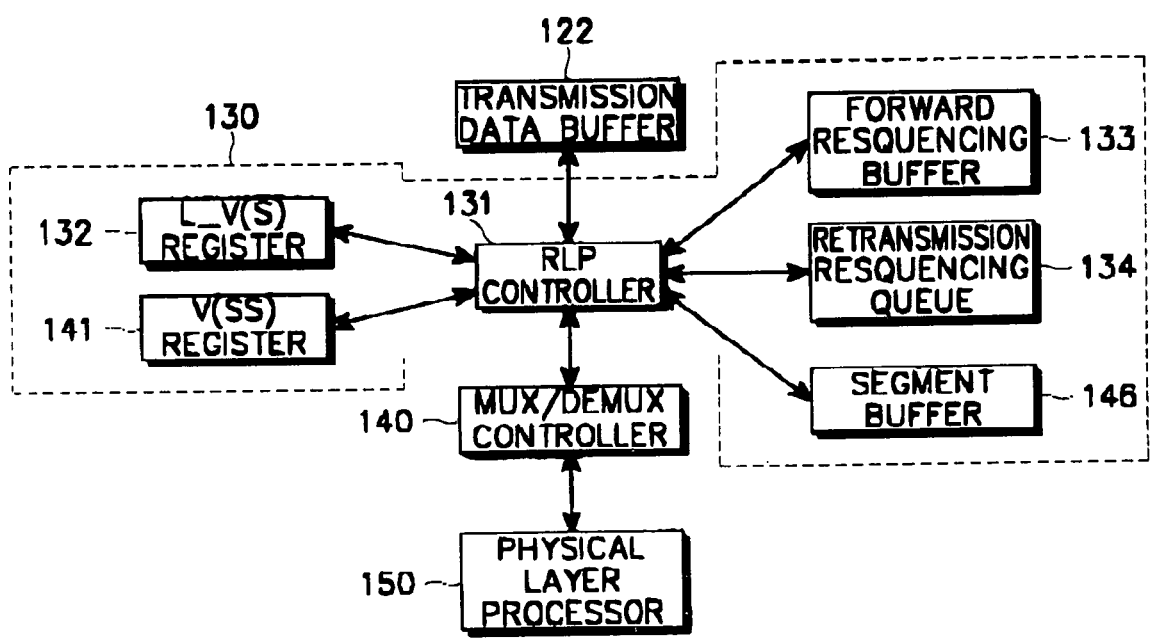
FIG. 5 is a block diagram of an RLP data transmitter according to the present invention.

FIG. 5 is a block diagram of an RLP frame transmitter according to the present invention.

Referring to FIG. 5, the RLP frame transmitter of the present invention includes a transmission data buffer 122, an RLP processor 130, a MUX/DEMUX controller 140, and a physical layer processor 150. The transmission data buffer 122 stores a data stream to be transmitted. Upon request for RLP frame generation from the MUX/DEMUX controller 140, the RLP processor 130 reads data within a requested size from the data stream stored in the transmission data buffer 122 and generates RLP frames. Upon request for RLP frame retransmission from an RLP frame receiver, the RLP processor 130 retransmits corresponding RLP frames. The MUX/DEMUX controller 140 requests the RLP processor 130 to generate RLP frames, multiplexes RLP frames (or data blocks) received from the RLP processor 130 in response to the request to physical channel information bits, and feeds the physical information bits to the physical layer processor 150. While the MUX/DEMUX controller 140 is shown to request one RLP processor 130 to generate or retransmit RLP frames, a plurality of RLP processors can be used. The physical layer processor 150 subjects the received physical channel information bits to encoding and modulation based on the CDMA standards and transmits the resulting information bits to a receiver over a physical channel.

The RLP processor 130 has an RLP controller 131, an L_V(S) register 132, a V(SS) register 141, a forward resequencing buffer 133, a retransmission request queue 134, and a segment buffer 146. The RLP controller 131 provides overall control to operations for generating RLP frames to be transmitted/retransmitted. The L_V(S) register 132 acts as a sequence number counter for counting the sequence number of a new RLP frame and storing it under the control of the RLP controller 131. The sequence number includes the frame sequence number of an RLP frame and the data sequence number of a byte data in the RLP frame. The RLP controller 131 reads a count value from the L_V(S) register 132, generates a new frame, and then increases the count value of the L_V(S) register 132 by 1. The V(SS) register 141 segments an RLP frame and stores the sequence numbers of the segmented frames.

The forward resequencing buffer 133 stores an RLP frame generated by the RLP controller 131. The retransmission request queue 134 stores a retransmission frame generated upon request for retransmission from the RLP frame receiver. Here, the retransmission frame is stored along with its sequence number. The retransmission request queue 134 functions to arrange stored retransmission frames in the order of their sequence numbers. The segment buffer 146 stores segmented RLP frames.

Figure 6:
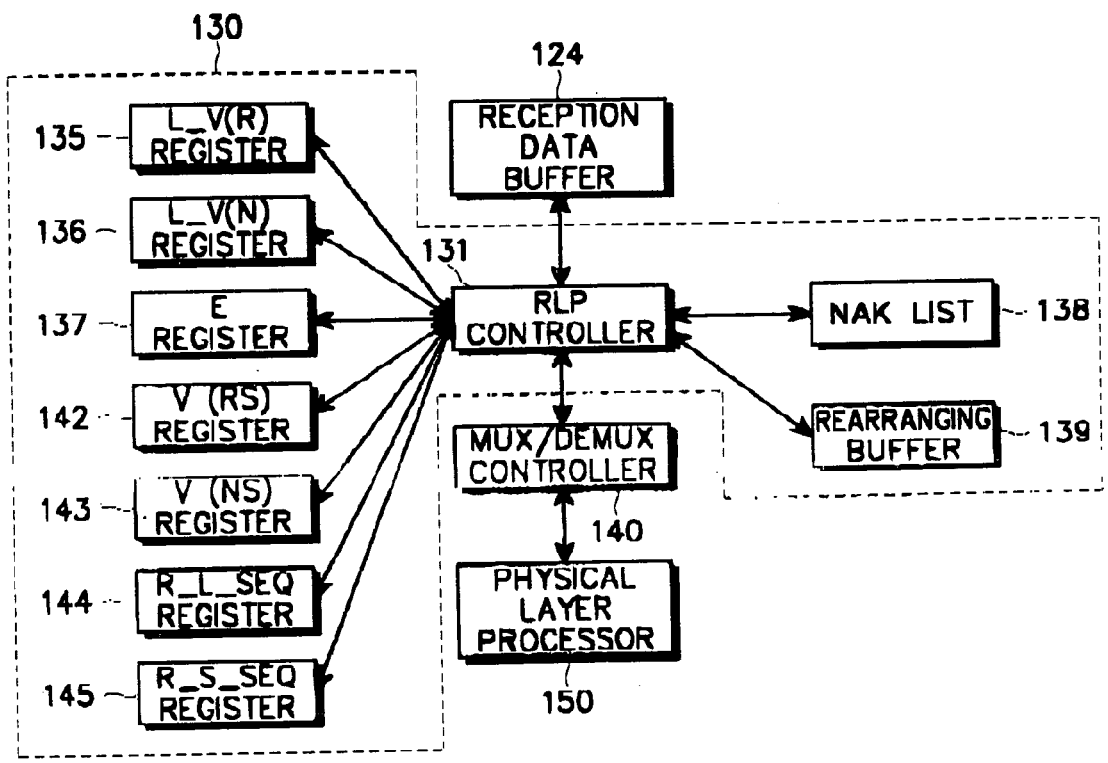
FIG. 6 is a block diagram of an RLP data receiver according to the present invention.

FIG. 6 is a block diagram of an RLP frame receiver according to the present invention.

Referring to FIG. 6, the RLP frame receiver of the present invention includes the physical layer processor 150, the MUX/DEMUX controller 140, the RLP processor 130, and a reception data buffer 124. The physical layer processor 150 subjects physical channel information bits received from the RLP frame transmitter over a physical channel to demodulation and decoding based on the CDMA 2000 standards and feeds the resulting RLP frames to the MUX/DEMUX controller 140. The MUX/DEMUX controller 140 demultiplexes the received RLP frames and feeds the demultiplexed RLP frames to the RLP processor 130. The RLP processor 130 determines whether the received RLP frames include new data or retransmitted data. If there are no frames lost during transmission, the RLP processor 130 stores the received RLP frames in the reception data buffer 124. On the other hand, if there is a lost frame, the RLP processor 130 requests the RLP frame transmitter to retransmit the lost frame.

The RLP processor 130 includes the RLP controller 131, registers 135 to 137 and 142 to 145, a NAK list 138, and a rearranging buffer 139. The RLP controller 131 provides an overall control to the operation of receiving RLP frames and storing them in the reception data buffer 124 and requests retransmission of a lost frame to the RLP frame transmitter if there exists a lost frame.

The L_V(R) register 135 stores the sequence number of a frame expected to be received under the control of the RLP controller 131. The L_V(N) register 136 stores the lowest of the sequence numbers of frames that have not been received. The E register 137 stores the count number of lost RLP frames.

The RLP controller 131 checks whether RLP frames received from the MUX/DEMUX controller 140 are in due order. The L_V(R) register 135 compares the stored frame sequence number with the sequence number of a received RLP frame. If they are equal, the RLP controller 131 determines that there are no frames lost during transmission and transmits the data of the received RLP frame to the reception data buffer 124. Otherwise, the RLP controller 131 determines that a frame with a sequence number between the stored sequence number and the sequence number of the received RLP frame has been lost. Then, the data of the received RLP frame is stored in the rearranging buffer 139, information about the lost frame to be requested for retransmission is written in the NAK list 138, and the information is later transmitted along with a control frame. Upon notification of the lost RLP frame from the MUX/DEMUX controller 140, the RLP controller 131 reflects the lost frame in the value of the E register 137 for use in initialization.

The NAK list 138 lists the sequence numbers of lost frames, the data sequence numbers of the first and last bytes of each data, an indicator indicating that a frame is completely received, a retransmission timer, and a round timer. The NAK list 138 writes information about data to be re-received and maintains a retransmission timer value used to request retransmission or quit a retransmission request. The rearranging buffer 139 stores data in a random order and rearranges them in due order upon receipt of lost data, and feeds the rearranged data to the reception data buffer 124.

The V(RS) register 142 and the V(NS) register 143 store the data sequence numbers of segmented frames. The V(RS) register 142 stores the data sequence number of a new segmented frame expected to be received next time and the V(NS) register 143 stores the data sequence number of first data of the RLP frame with the sequence number stored in the L_V(N) register 136. The R_L_SEQ register 144 stores the highest of the sequence numbers of RLP frames received for a predetermined time period. The R_S_SEQ register 145 stores the highest of the sequence numbers of segmented frames received for a predetermined time period. The RLP controller 131 determines whether to decrease a retransmission timer value in each NAK entry based on the values stored in the R_L_SEQ register 144 and the R_S_SEQ register 145.

RLP frame retransmission request and retransmission operations in the RLP frame transmitter and the RLP frame receiver shown in FIGS. 5 and 6 can be summarized as below.

The RLP frame transmitter transmits a plurality of RLP frames each having a frame sequence number and a data sequence number.

The RLP frame receiver receives the RLP frames from the transmitter and stores the sequence numbers of lost frames. Then, the RLP frame receiver transmits a NAK frame including a field that provides the sequence numbers of the lost frames to the RLP frame transmitter.

In response to the NAK frame, the RLP frame transmitter retransmits the corresponding frames in the order of their sequence numbers. The retransmitted frames are also given to their sequence numbers.

The RLP frame receiver receives the retransmitted frames in the order of their sequence numbers from the RLP frame transmitter and compares the stored sequence numbers with those of the received frames. If it turns out that one RLP frame is not received again in the comparison, the RLP frame receiver transmits a NAK frame including a field that provides the sequence number of the non-received RLP frame to the RLP frame transmitter.

While an RLP frame generation and transmission/reception operation can be described separately with respect to the RLP processors 130 and 230, they operate in the same manner. Therefore, the RLP processor 130 only will be described for clarity of description.

Two Dimensional Addressing Scheme

The RLP controller 131 in the RLP frame transmitter reads data from a data stream stored in the transmission data buffer 122 and generates RLP frames of or below a size requested by the MUX/DEMUX controller 140. The data stream stored in the transmission data buffer 122 is assumed to have an infinite length. Therefore, the RLP controller 131 makes no distinction between the start and end of the data stream. The generated RLP frames can be divided into RLP frames of a fixed size and RLP frames of a variable size. The two kinds of RLP frames may have $N_{DATA}$ byte-data at maximum.

In the present invention, the bytes of an RLP frame are numbered with 0 to $N_{DATA}-1$. These sequence numbers are termed data sequence numbers. 0 is assigned to the first data byte of the RLP frame and the next data byte is numbered with a sequence number 1 higher than that of the previous data byte. Since the RLP frame can have $N_{DATA}$ bytes, there is no data sequence number greater than $N_{DATA}-1$.

Also in the present invention, a sequence number is given to each RLP frame. This sequence number is called a frame sequence number. The first generated RLP frame is numbered with 0 and a new RLP frame is numbered with a sequence number higher than that of the previous RLP frame by 1. If the previous RLP frame is labeled with $(2^N-1)$, the next RLP frame is labeled with 0.

Use of frame sequence numbers and data sequence numbers allow a specific data byte of a specific RLP frame to be identified. This scheme will be termed "two dimensional addressing" in the present invention. In addition, a two dimensional address including the frame sequence number and the data sequence number of a specific data byte will be called "a sequence number" in brief.

The greater than/less than/equal relationship between two sequence numbers is defined in the two dimensional addressing scheme as follows.

TABLE 1

There are two sequence numbers (L_SEQ$_1$, S_SEQ$_1$) and (L_SEQ$_2$, S_SEQ$_2$}, L_SEQ$_1$ and L_SEQ$_2$ are frame sequence numbers, and S_SEQ$_1$ and S_SEQ$_2$ are data sequence numbers in two dimensional addressing. Then,
(1)    if (L_SEQ$_1$ + 1) modulo $2^N$ ≦ L_SEQ$_2$ ≦
     (L_SEQ$_1$ + $2^{N-1}$ − 1) modulo $2^N$ then
     (L_SEQ$_2$, S_SEQ$_2$) > (L_SEQ$_1$, S_SEQ$_1$);
(2)    if (L_SEQ$_1$ + $2^{N-1}$) modulo $2^N$ ≦ L_SEQ$_2$ ≦
     (L_SEQ$_1$ + $2^{N-1}$ − 1) modulo $2^N$ then
     (L_SEQ$_2$, S_SEQ$_2$) < (L_SEQ$_1$, S_SEQ$_1$);
(3)    if L_SEQ$_1$ = L_SEQ$_2$ and S_SEQ$_1$ < S_SEQ$_2$,
     (L_SEQ$_2$ then S_SEQ$_2$ > (L_SEQ$_1$, S_SEQ$_1$);
(4)    if L_SEQ$_1$ = L_SEQ$_2$ and S_SEQ$_2$ < S_SEQ$_1$ then
     L_SEQ$_2$, S_SEQ$_2$) < (L_SEQ$_1$, S_SEQ$_1$); and
(5)    L_SEQ$_1$ = L_SEQ$_2$ and S_SEQ$_2$ = S_SEQ$_1$ then
     (L_SEQ$_2$, S_SEQ$_2$ >= (L_SEQ$_1$, S_SEQ$_1$>.

A specific data in a specific RLP frame can be designated by the use of the above-defined two dimensional addressing scheme of the present invention. That is, the data can be represented using the sequence numbers of the first and last bytes of the data. Since the sequence number of the first byte ≦ the sequence number of each byte of the data ≦ the sequence number of the last byte, it is easily determined whether a certain data byte is included in the designated data referring to Table 1. Therefore, a specific data is represented by two sequence numbers. For example, two sequence numbers <L_SEQ$_A$, S_SEQ$_A$> and <L_SEQ$_B$, S_SEQ$_B$> designate all data having <L_SEQ$_A$, S_SEQ$_A$>≦ sequence numbers ≦<L_SEQ$_B$, S_SEQ$_B$>. The sequence number <L_SEQ$_A$, S_SEQ$_A$> of the first byte is called the first sequence number and the sequence number of <L_SEQ$_B$, S_SEQ$_B$> of the last byte, the last sequence number of the data.

Table 2 defines a sequence number between two sequence numbers when there are the three sequence numbers in the two dimensional addressing scheme.

TABLE 2

There are three sequence numbers (L_SEQ$_1$, S_SEQ$_1$, (L_SEQ$_2$, S_SEQ$_2$), and (L_SEQ$_3$), S_SEQ$_3$, L_SEQ$_1$, L_SEQ$_2$, and L_SEQ$_3$ are frame sequence numbers, and S_SEQ$_1$, S_SEQ$_2$, and S_SEQ$_3$ are data sequence numbers. Then, if (L_SEQ$_1$, S_SEQ$_1$) ≦ (L_SEQ$_2$, S_SEQ$_2$ ≦ (L_SEQ$_3$, S_SEQ$_3$) (L_SEQ$_2$, S_SEQ$_2$) represents data included in the data represented by (L_SEQ$_1$, S_SEQ$_1$) and (L_SEQ$_2$, S_SEQ$_2$).

To transmit/receive an RLP frame of a variable length, the present invention uses a field LAST_SEQ indicating the last frame segment and ($N_{DATA}$-1) as a data sequence number indicating the last byte. When transmitting the RLP frame separately in a plurality of frame segments, the RLP frame transmitter sets LAST_SEG of the last frame segment to 1 because the RLP frame receiver does not know the length of the RLP frame. If LAST_SEG is 1, the RLP frame receiver determines that the received frame segment is the last one of the RLP frame.

When requesting retransmission, the RLP frame receiver designates data to be retransmitted by setting its first and last sequence numbers. In the case of an RLP frame of a variable length, the RLP frame receiver does not know the frame length, as stated above. Therefore, if the RLP frame receiver fails to receive the last frame segment, it cannot find out the last sequence number. In this case, ($N_{DATA}$-1) is used as the last sequence number of the retransmission data. If the RLP frame transmitter receives a retransmission request for data with ($N_{DATA}$-1) as the last sequence number, it considers that a corresponding frame should be retransmitted up to its last byte.

Figure 7:
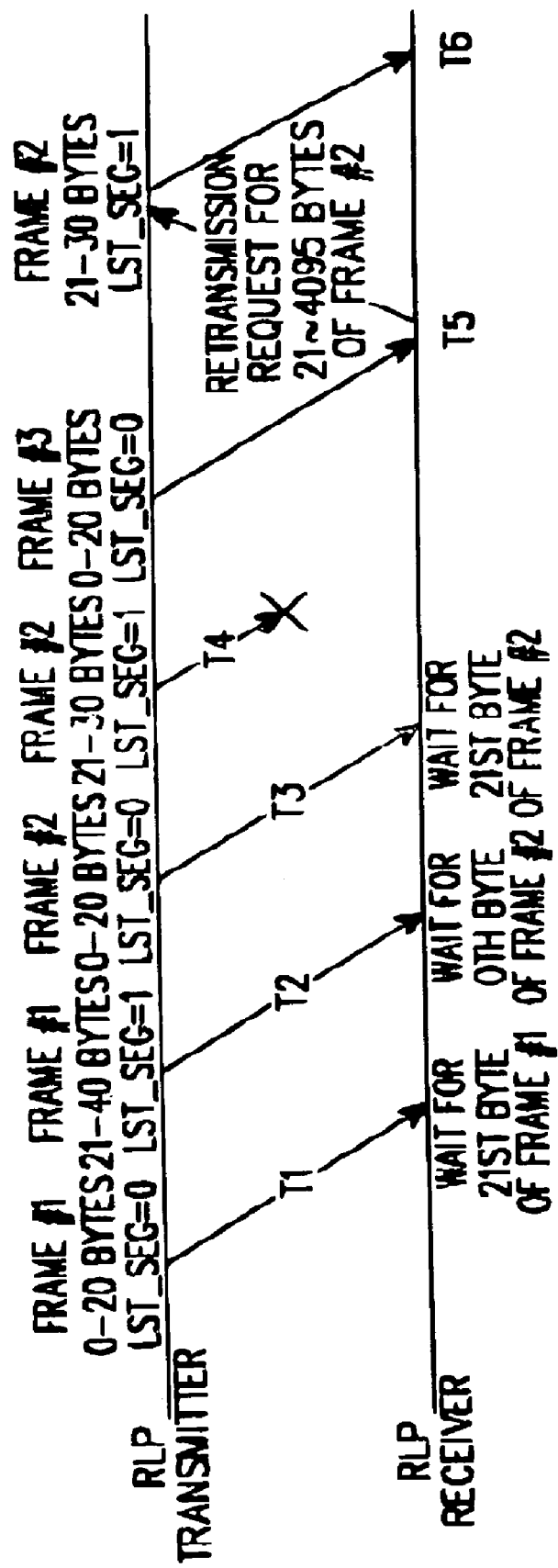
FIG. 7 illustrates an example of transmission and reception of RLP frames of a variable length in a two dimensional addressing scheme according to the present invention.

FIG. 7 illustrates an example of transmission and reception of RLP frames of a variable length in the two dimensional addressing scheme according to the present invention. Frame segments are communicated on the assumption that there are frame #1 with 40 bytes and frame #2 with 30 bytes and each frame can have 4096 bytes at maximum.

Referring to FIG. 7, the RLP frame transmitter transmits frame #1 separately in two 20-byte frame segments at T1 and T2, respectively. At T1, the RLP frame transmitter transmits the first frame segment with 20-byte data. Since this frame segment is not the last one, its LST_SEQ is set to 0. The RLP frame transmitter transmits the last frame segment with LST_SEQ set to 1 at T2. The RLP frame receiver determines from the field LST_SEQ set to 1 that frame #1 occupies a total of 40 bytes. The RLP frame transmitter transmits frame #2 in separate frame segments with 20 and 10 bytes, respectively at T3 and T4. In case the last frame segment of frame #2 is damaged and the first frame segment of frame #3 arrives at the RLP frame receiver, the RLP frame receiver transmits a retransmission request for the 21$^{st}$ through the last bytes of frame #2, that is, the 21$^{st}$ through 4095(i.e., 4096-1)$^{th}$ bytes of frame #2 at T5. The RLP frame transmitter retransmits the 21$^{st}$ through the last bytes of frame #2 at T6. Here, LST_SEQ is set to 1. The RLP frame receiver recognizes from LST_SEQ set to 1 that frame #2 has a total of 30 bytes and all data of frame #2 has been received.

RLP Frame Transmission/Reception

Basically, RLP operates based on NAK in the present invention. In other words, if there exists non-received data among data transmitted from the RLP frame transmitter, the RLP frame receiver requests retransmission of data of a lost frame.

According to the RLP utilizing the two dimensional addressing scheme, non-received data can be represented by the use of two sequence numbers (a frame sequence number and data sequence numbers). Therefore, the RLP frame receiver transmits the two sequence numbers as a retransmission request to the RLP frame transmitter.

To implement a rapid retransmission requesting and requested frame retransmitting operation in the RLP supporting the two dimensional addressing scheme according to the present invention, the RLP frame transmitter and the RLP frame receiver operate in the following way. The RLP frame transmitter, if it is to transmit a plurality of retransmission frames, transmits a retransmission frame of the lowest sequence number in the first place according to Table 1. Since each retransmission frame has a frame sequence number and a first byte data sequence number, the first sequence number of data to be transmitted can be achieved. Therefore, the RLP frame transmitter arranges the retransmission frames in an ascending order according to their first sequence numbers and Table 1. The RLP frame transmitter transmits the retransmission frames in the arranged order so as to transmit data that the RLP frame receiver needs to receive in the first place, earlier than the other data.

The RLP frame receiver prepares a retransmission timer for each retransmission request to request retransmission of lost data in case a retransmission request does not reach the RLP frame transmitter or the requested data is damaged during transmission. Because the RLP frame transmitter processes a retransmission request for data with the lowest sequence number first, the RLP frame receiver decreases a retransmission timer value for awaited data on the following conditions. That is, the RLP frame receiver decreases the retransmission timer value by 1 if it receives data with a higher first sequence number than that of the awaited data. However, if the RLP frame receiver receives data with a lower first sequence number than that of the data awaited, it does not decrease the retransmission timer value.

Data Transmission of MUX/DEMUX Controller

The MUX/DEMUX controller 140 in the RLP frame transmitter requests the transmitting RLP controller 131 to generate RLP frames. The MUX/DEMUX controller 140 generates such requests at every predetermined intervals but when and how large RLP frame it requests varies depending on the configuration of the MUX/DEMUX controller 140.

The MUX/DEMUX controller 140 notifies a channel to be used for transmission and information about the maximum permitted size T of an RLP frame, requesting the RLP controller 131 to generate the RLP frame. The RLP controller 131 generates RLP frames within the maximum size T. When necessary, the MUX/DEMUX controller 140 specifies an RLP frame size for the RLP controller 131. In this case, the RLP controller 131 generates RLP frames of the designated size. If the MUX/DEMUX controller 140 receives RLP frames of a size less than the intended size, it can adjust the RLP frame size to the intended size by adding "0s" to the ends of the RLP frames.

The MUX/DEMUX controller 140 receives data blocks from RLP controllers 131 provided for each service, constructs physical channel information bits out of the data blocks, and feeds the physical channel information bits to the physical layer processor 150. Herein below, RLP frames that the RLP controller 131 transmits to the MUX/DEMUX controller 140 are called "data blocks" and transmission units that the MUX/DEMUX controller 140 transmits to the physical layer processor 150 are called "physical channel information bits". The physical layer processor 150 subjects the physical channel information bits to encoding and modulation according to the CDMA 2000 standards and transmits the resulting frames over a physical channel.

Figure 10:
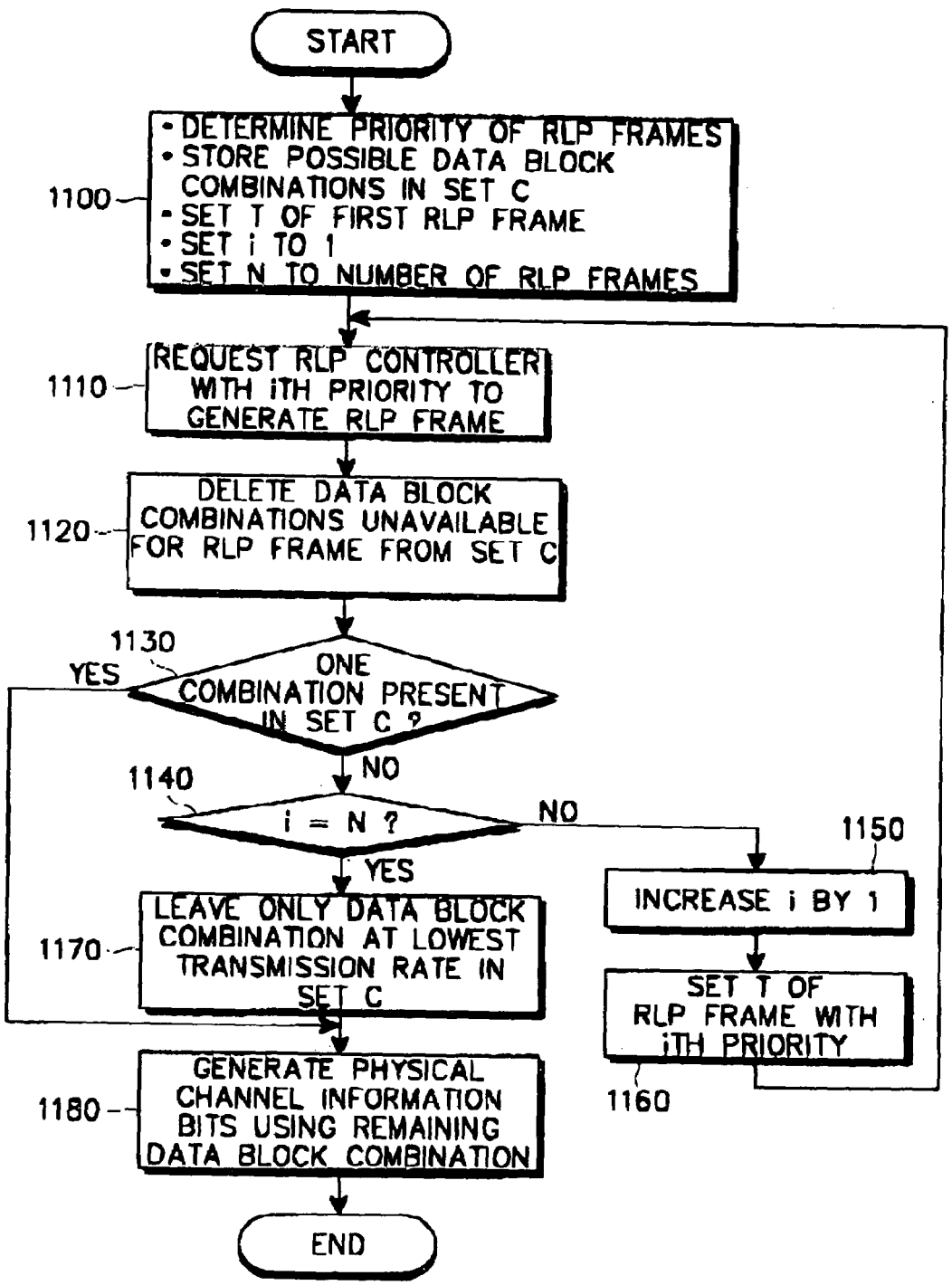
FIG. 10 is a flowchart illustrating a physical channel information bit generating procedure in a MUX/DEMUX controller according to the present invention.

FIG. 10 is a flowchart illustrating a procedure of generating physical channel information bits in the MUX/DEMUX controller 140 of the transmitter.

Referring to FIG. 10, the MUX/DEMUX controller 140 determines the priority of each RLP frame prior to generation of physical channel information bits in step 1100. The transmission priority can be changed to ensure the quality of each service in which data is communicated by RLP. The MUX/DEMUX controller 140 has a table listing combinations of data blocks available over each physical channel. These data block combinations are shown in Table 3. It is to be noted here that Table 3 does not show all information bit structures of all channels available in CDMA 2000 but show only the structure of fundamental channel information bits available in a transmission rate set 1.

TABLE 3

Fundamental channel information bit structure available in transmission set 1

| transmission rate | information bit header | first RLP | second RLP | information bit length |
|---|---|---|---|---|
| 9.6 kbps | 0 | 171 bits | — | 172 bits |
| | 1100 | 80 bits | 88 bits | |
| | 1101 | 40 bits | 128 bits | |
| | 1110 | 16 bits | 152 bits | |
| | 1111 | — | 168 bits | |
| 4.8 kbps | — | 80 bits | — | 80 bits |
| 2.7 kbps | — | 40 bits | — | 40 bits |
| 1.5 kbps | — | 16 bits | — | 16 bits |

In Table 3, transmission rate indicates a transmission rate at which generated physical channel information bits are transmitted and information bit length indicates the maximum permitted number of information bits. Transmission rate varies with information bit length, as noted from Table 3. That is, 172 information bits and 80 information bits are transmitted at 9.6 and 4.8 kbps, respectively, and 40 information bits and 16 information bits are transmitted at 2.7 and 1.5 kbps, respectively.

In the physical channel information structure of Table 3, RLP frames are generated from two RLP controllers at maximum and the RLP controllers are called a first RLP controller and a second RLP controller herein below. As shown in Table 3, RLP frames included in physical channel information bits are discriminated based on an information bit header at the start of the information bits. For example, in the case of information bits including a 171-bit RLP frame generated in the first RLP, the first information bit is set to "0". In the case of information bits including an 80-bit RLP frame generated in the first RLP and an 88-bit RLP frame generated in the second RLP, the first four information bits are set to "1100". Therefore, the MUX/DEMUX controller 140 in the receiver detects the sizes, number, and destinations of RLP frames included in received information bits from such an information bit header.

The MUX/DEMUX controller 140 in the RLP frame transmitter stores 8 possible combinations of data blocks shown in Table 3 in a set C in step 1100. Then, the MUX/DEMUX controller 140 determines the maximum size T of an RLP frame that is to be transmitted by the first RLP frame controller and sets i to 1.

In step 1100, the MUX/DEMUX controller 140 requests an RLP controller with higher priority to generate an RLP frame of a permitted maximum size. If the higher priority is given to the first RLP controller in Table 3, the MUX/DEMUX controller 140 requests the first RLP controller to generate an RLP frame of 171 bits at maximum. If the higher priority is given to the second RLP controller, it requests the second RLP controller to generate an RLP frame of 168 bits at maximum. In the following description, it is assumed that priority is given to the second RLP controller.

In step 1120, the MUX/DEMUX controller 140 deletes combinations other than combinations in which the generated RLP frame can be transmitted from the set C. When the second RLP controller generates a 40-bit RLP frame and a combination that can transmit the 40-bit second RLP frame is expressed as <first RLP frame, second RLP frame>, possible combinations are <80 bits, 88 bits>, <40 bits, 128 bits>, <16 bits, 152 bits>, and <0 bit, 168 bits>.

In step 1130, the MUX/DEMUX controller 140 determines whether only one combination remains in the set C. If only one combination remains, the procedure goes to step 1180 and, otherwise, it goes to step 1140. The MUX/DEMUX controller 140 determines whether i is equal to N in step 1140. If they are equal, the procedure goes to step 1170. Otherwise, i is increased by 1 in step 1150 and the procedure goes to step 1160.

In step 1160, the MUX/DEMUX controller 140 determines the maximum size of an RLP frame that it will request an RLP controller second in priority to generate from the remaining combination. Then, the MUX/DEMUX controller 140 returns to step 1100 to request the corresponding RLP controller to generate the RLP frame. Here, the first RLP controller is requested to generate an RLP frame of 80 bits at maximum.

If different combinations can be made for a given data block, the MUX/DEMUX controller 140 selects one of them that it considers appropriate in step 1170. If the first RLP controller generates a 16-bit RLP frame in step 1110, constructible combinations for the 40-bit second RLP frame are <80 bits, 88 bits>, <40 bits, 128 bits>, and <16 bits, 152> bits, referring to Table 3. The combinations are of the same transmission rate. Therefore, the MUX/DEMUX controller 140 can select any of them. On the other hand, if the first RLP controller generates no RLP frames in step 1110, <0 bit, 168bits> is the only combination available for the 40-bit second RLP frame.

In step 1180, the MUX/DEMUX controller 140 generates information bits out of the given data block and the one remaining combination. In the case of a 16-bit first RLP frame, a 40-bit second RLP frame, and combination <80 bits, 88 bits>, the MUX/DEMUX controller 140 adds 64 0s to the end of the first RLP frame to make an 80-bit data block, 48 0s to the end of the second RLP frame to make an 88-bit data block, and "1100" as an information bit header to the start of the two blocks, thereby completing 172 information bits. In the case of a 0-bit first RLP frame and a 40-bit second RLP frame, 128 0s are added to the end of the second RLP frame to make a 168-bit data block and a information bit header "1111" is added to the start of the data block, thereby completing 172 information bits. The information bits are fed to the physical layer controller 150 and then transmitted to the MUX/DEMUX controller 140 of the receiver over a physical channel.

Data Reception of MUX/DEMUX Controller

The MUX/DEMUX controller 140 in the RLP frame receiver separates RLP frames from physical channel information bits based on possible physical channel information bit structures and the information bit header and transmits the separated RLP frames to corresponding RLP controllers. Having a table listing constructible combinations of data blocks for each physical channel such as Table 3, the MUX/DEMUX controller 140 can interpret the received information bits. If the MUX/DEMUX controller 140 considers that the received information bits are defective, it notifies each RLP controller of the reception of the defective frames.

RLP Frame Formats

FIGS. 8A to 8F and FIGS. 9A and 9B illustrate RLP frame types that the RLP controller 131 can transmit to the MUX/DEMUX controller 140.

Figure 8:
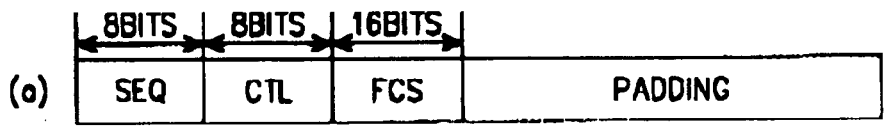
FIGS. 8A to 8F illustrate frame formats transmitted over a fundamental channel and a dedicated control channel on which to transmit/receive an RLP frame generated according to the present invention.
Figure 8:
Figure 8:
Figure 8:
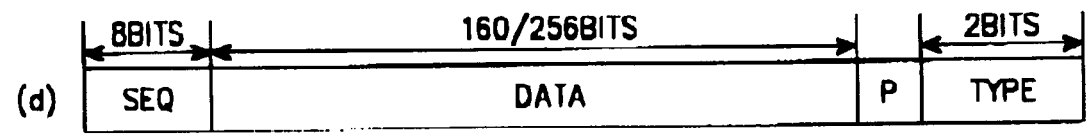
Figure 8:
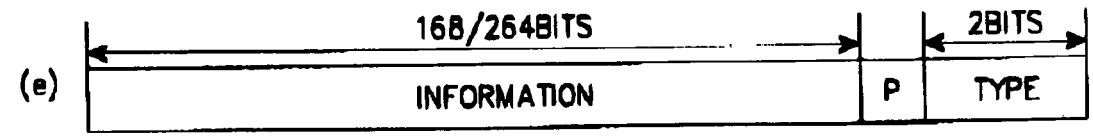
Figure 8:
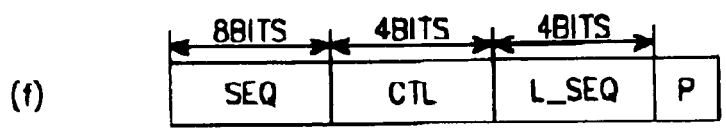

In the present invention, SYNC, SYNC/ACK, and ACK shown in FIG. 8A and a NAK frame shown in Table 4 are grouped into "control frames", and a data transmitting frame is called "data frame". Data frames are divided into a new data frame and a retransmission data frame according to whether the frame is newly transmitted or retransmitted. The data frames are also divided into an unsegmented data frame and a segmented data frame. As shown in FIG. 8F, a frame with SEQ fields of 12 bits is called "an idle frame or intersegment fill frame", aside from the terms of the control frame and the data frame.

FIGS. 8A to 8F illustrate the formats of RLP frames transmittable over a fundamental channel or a dedicated control channel.

When necessary, the RLP controller 131 constructs a control frame in the following way. For a SYNC, ACK, or SYNC/ACK frame, SEQ is set to the lower 8 bits of a frame sequence number stored in the L_V(S) register 132, CTL is set according to a frame type, and then FCS follows the CTL. FCS is a 16-bit frame check sequence generated by a polynomial as provided by RFC-1662. The FCS field is formed for all the previous bits. The RLP controller 131 sets all bits following FCS to 0s.

When there exists a frame to be retransmitted, the RLP controller 131 in the RLP frame receiver generates a NAK frame and transmits the NAK frame to the MUX/DEMUX controller 140. The structure of the NAK frame is shown in Table 4.

TABLE 4

| field | length |
| --- | --- |
| SEQ | 8 bits |
| CTL | 8 bits |
| L_SEQ_HI | 4 bits |
| NAK_FRM_COUNT | 3 bits |
| NAK_SEQ_COUNT | 3 bits |
| The following fields occur (NAK_FRM_COUNT + 1) times | |
| FIRST | 12 bits |
| LAST | 12 bits |

TABLE 4-continued

| field | length |
| --- | --- |
| The following fields occur (NAK_SEQ_COUNT + 1) times | |
| NAK_SEQ | 12 bits |
| FIRST_SEQ | 12 bits |
| LAST_SEQ | 12 bits |
| The following fields follow the above fields | |
| PADDING_1 | variable |
| FCS | 16 bits |
| PADDING_2 | variable |

The RLP controller 131 fills the upper 4 bits of a sequence number stored in the L_V(N) register 136 in L_SEQ_HI and the lower 8 bits of the sequence number stored in the L_V(N) register 136 in SEQ, and sets CTL to "1100 1000". The RLP controller 131 sets NAK_FRM_COUNT to (the number of retransmission requests for a frame to be included in the NAK frame)-1. The RLP controller 131 sets NAK_SEQ_COUNT to (the number of retransmission requests for part of the frame to be included in the NAK frame)-1.

The RLP controller 131 fills as many retransmission requests as (NAK_FRM_COUNT+1) for the whole frame. Its frame sequence number is enough to generate a retransmission request for the whole frame. The RLP controller 131 fills the 12-bit frame sequence number of a first frame in FIRST and the 12-bit frame sequence number of a last frame in LAST.

The RLP controller 131 fills as many retransmission requests as (NAK_SEQ_COUNT+1) for part of the frame. The first and last sequence numbers of the data part are required to request retransmission of the frame part. The RLP controller 131 fills the 12-bit frame sequence number of the frame part in NAK_SEQ, the 12-bit first sequence number of the frame part in FIRST_SEQ, and the 12-bit last sequence number of the frame part in LAST_SEQ. The retransmission request for the data part is valid for the frame part only. By giving just two frame sequence numbers, a retransmission request can be generated for data across a plurality of frames.

After filling the retransmission requests, the RLP controller 131 pads the FCS field with 0s for byte arrangement and fills the FCS field. The FCS field is a 16-bit frame check sequence generated by a polynomial as provided by RFC-1662. The FCS field is constructed for all the previous bits. Then, the RLP controller 131 fills the remaining part of the NAK frame with 0s.

The RLP controller 131 generates a data frame to be transmitted over a fundamental channel or a dedicated control channel in the following manner. As shown in FIG. 8B, the RLP controller 131 fills the lower 8 bits of the frame sequence number of an RLP frame to be transmitted in SEQ and sets CTL to 0. If the RLP frame is to be retransmitted, REXMIT is set to 1 and otherwise, it is set to 0. The RLP controller 131 sets LEN to the length of data to be transmitted, fills the data following LEN, and fills the remaining part of the RLP frame with 0s.

The RLP controller 131 generates a segmented data frame including part of an RLP frame to be transmitted over a fundamental channel or a dedicated control channel in the following ways. As shown in FIG. 8C, the RLP controller 131 fills the lower 8 bits of the frame sequence number of an RLP frame segment to be transmitted in SEQ and sets CTL to "10000". If the RLP frame segment is to be retransmitted, REXMIT is set to 1 and, otherwise, it is set to 0. The RLP controller 131 fills S_SEQ with the 12-bit data sequence number of the first byte of the data to be transmitted. If the segmented data frame includes the last byte of a corresponding RLP frame, LAST is set to 1. Otherwise, it is set to 0. The RLP controller 131 sets LEN to the length of the data to be transmitted, places the data following S_SEQ, and fills the other part of the data frame with 0s.

RLP frames according to the present invention use two different formats shown in FIGS. 8D and 8E at the highest transmission rate (i.e., 9.6 or 14.4 kbps) of a fundamental channel or a dedicated control channel. The two formats are identified by their last 2-bit fields TYPE. The format shown in FIG. 8D is used to transmit only data and has SEQ filled with the lower 8 bits of a frame sequence number stored in the L_V(S) register 132 and TYPE set to 11 for retransmitted data and 10 for new data. In the format shown in FIG. 8E, an information field is filled with a frame in the format shown in FIGS. 8A, 8B, or 8C and TYPE is set to 00.

The RLP controller 131 generates an idle frame or an intersegment fill frame to be transmitted over a fundamental channel or a dedicated control channel in the following manner. As shown in FIG. 8F, SEQ is filled with the lower 8 bits of a frame sequence number stored in the L_V(S) register 132 and L_SEQ with the upper 4 bits of the frame sequence number of the L_V(S) register 132. CTL is set to "1001" for an idle frame and to "1010" for an intersegment fill frame.

Figure 9:
FIGS. 9A and 9B illustrate frame formats transmitted over a supplemental channel on which to transmit/receive an RLP frame generated according to the present invention.
Figure 9:

FIGS. 9A and 9B illustrate the formats of an RLP frame transmitted over a supplemental channel according to the present invention.

The RLP controller 131 generates a data frame to be transmitted over a supplemental channel in the following way. In FIG. 9A, SEQ is filled with the lower 8 bits of the frame sequence number of an RLP frame to be transmitted. If the RLP frame is to be retransmitted, TYPE is set to 10 and otherwise, it is set to 11. The RLP controller 131 fills the other part of the data frame with data.

The RLP controller 131 generates a segmented data frame including part of an RLP frame to be transmitted over a supplemental channel in the following way. In FIG. 9B, SEQ is filled with the lower 8 bits of the frame sequence number of the RLP frame and CTL and TYPE are set to "00" and "01", respectively. If the segmented frame is to be retransmitted, REXMIT is set to 1 and otherwise, it is set to 0. The RLP controller 131 fills S_SEQ with the 12-bit data sequence number of the first byte of the data to be transmitted. If the segmented data frame includes the last byte of the RLP frame, LST is set to 1 and otherwise, it is set to 0. The RLP controller 131 places data following LAST and fills the other part of the frame with 0s.

Initialization of RLP Controller

Prior to frame transmission/reception, the RLP controller 131 sets the initial values of the L_V(S) register 132, the LV(R) register 135, the LV(N) register 136, the E register 137, the V(SS) register 141, the V(RS) register 142, the V(NS) register 143, the R_L_SEQ register 144, and the R_S_SEQ register 145 to 0s. Also the RLP controller 131 deletes all entries of the forward resequencing buffer 133, the retransmission request queue 134, the NAK list 138, the rearranging buffer 139, and the segment buffer 146. In the present invention, it is assumed that each of the L_V(S) register 132, the L_V(R) register 135, the L_V(N) register 136, the R_L_SEQ register 144, the V(SS) register 141, the V(RS) register 142, the V(NS) register 143, and the R_S_SEQ register 145 can store a 12-bit integer.

The RLP controller 131 is initialized as follows:
(1) the RLP controller 131 continuously transmits SYNC frames to the MUX/DEMUX controller 140;
(2) upon receipt of a SYNC frame from the MUX/DEMUX controller 140 during performing step (1), the RLP controller 131 continuously transmits SYNC/ACK frames to the MUX/DEMUX controller 140 until it receive a different frame from the SYNC frame; and
(3) upon receipt of a SYNC/ACK frame from the MUX/DEMUX controller 140 during performing step (1), the RLP controller 131 continuously transmits ACK frames to the MUX/DEMUX controller 140 until it receive a different from the SYNC/ACK frame.

Upon receipt of a different frame from the SYNC/ACK frame, that is, upon completion of the initialization, the RLP controller 131 initiates data transmission. The RLP controller 131 can transmit all other frames than the SYNC, SYNC/ACK, and ACK frames to the MUX/DEMUX controller 140.

Data Frame Transmission of RLP Controller

The RLP controller 131 uses the L_V(S) register 132 to designate a frame sequence number. When a new RLP frame is generated, the RLP controller 131 designates a value stored in the L_V(S) register 132 as the 12-bit frame sequence number of the new RLP frame. The RLP controller 131 stores the RLP frame in the forward resequencing buffer 133 in preparation for a possible retransmission request from the receiving side. The RLP controller 131 segments the RLP frame prior to transmission if the size of the RLP frame is a maximum size set by the MUX/DEMUX controller 140. If the RLP frame is less than the maximum size, the RLP controller 131 simply feeds the RLP frame to the MUX/DEMUX controller 140. The RLP controller 131 does not generate a new RLP frame until the generated data frame is completely transmitted.

When finishing transmitting the data frame, the RLP controller 131 sets the value of the L_V(S) register 132 to the remainder of dividing (the value of the L_V(S) register 132+1) by $2^{12}$. If data is retransmitted or a control frame/idle frame is transmitted, the value of the L_V(S) register 132 is not increased.

If there exists a retransmission frame in the retransmission request queue 134, the RLP controller 131 should retransmit the frame. The retransmission frame may be an unsegmented data frame or a segmented data frame. If the retransmission frame is an unsegmented data frame, the first sequence number of the data of the retransmission frame has a 12-bit frame sequence number stored along with the retransmission frame and a data sequence number "0". If the retransmission frame is a segmented data frame, the first sequence number of the data of the retransmission frame has a 12-bit frame sequence number stored along with the retransmission frame and 12 bits of S_SEQ as a data sequence number.

The RLP controller 131 transmits a retransmission frame with the lowest first sequence number in the first place in transmitting retransmission frames stored in the retransmission request queue 134. The RLP controller 131 segments the RLP frame to be retransmitted if it is greater than the maximum size set by the MUX/DEMUX controller 140. Otherwise, the RLP controller 131 just feeds the RLP frame to the MUX/DEMUX controller 140.

When there are no control frames, retransmission frames, and new data frames to transmit, the RLP controller 131 can transmit an idle frame shown in FIG. 8F to the MUX/DEMUX controller 140.

Transmission of Segmented Data Frame in RLP Controller

If an unsegmented data frame or a segmented data frame to be transmitted is larger than a maximum size set by the MUX/DEMUX controller 140, the RLP controller 131 segments the data frame prior to transmission. The unsegmented/segmented data frame to be transmitted will be referred to as "an RLP frame to be transmitted". If the maximum size is too small to transmit any segmented data frame, the RLP controller 131, the RLP controller 131 transmits no frame or an intersegment fill frame to the MUX/DEMUX controller 140.

In segmenting the RLP frame to be transmitted, the RLP controller 131 forms a segmented frame of the size requested by the MUX/DEMUX controller 140 by segmenting the RLP frame from the start. The segmented frame will be referred to as "a frame segment to be transmitted".

In forming frame segments from a new data frame, the RLP controller 131 uses the lower 8 bits of the frame sequence number of the RLP frame and the data sequence number of the first byte of the frame segment, stored in the V(SS) register 141. After the frame segment is completed, the RLP controller 131 increases the value of the V(SS) register 141 by the number of data bytes included in the frame segment.

On the other hand, in forming frame segments from a retransmission data frame, the RLP controller 131 operates in a different manner. The data sequence number of the first byte of a frame segment to be transmitted is "0" when the frame segment comes from an unsegmented data frame. If the frame segment comes from a segmented data frame, the field S_SEQ of the segmented data frame is used as the data sequence number of the first byte of the frame segment to be transmitted. The frame segment to be transmitted is formed using the lower 8 bits of the frame sequence number of an RLP frame to be transmitted and the above data sequence number.

The RLP controller 131 forms another frame segment out of the remaining data of the RLP frame to be transmitted. This frame segment will be referred to as "a remaining frame segment".

In forming frame segments from a new data frame, the RLP controller 131 uses the lower 8 bits of the frame sequence number of the RLP frame to be transmitted and the data sequence number of the first byte of the remaining frame segment, stored in the V(SS) register 141.

On the other hand, in forming frame segments from a retransmission data frame, the RLP controller 131 uses (the above-obtained data sequence number+the number of the data bytes of the frame segment to be transmitted) as the data sequence number of the first byte of the remaining frame segment. The remaining frame segment is formed using the lower 8 bits of the frame sequence number of an RLP frame to be transmitted and the above data sequence number.

The RLP controller 131 transmits the frame segment to the MUX/DEMUX controller 140. If the RLP frame to be transmitted is a retransmission data frame, the RLP controller 131 stores the remaining frame segment along with the 12-bit frame sequence number of the RLP frame in the retransmission request queue 134. If the RLP frame is a new data frame, the RLP controller 131 stores the remaining frame segment along with the 12-bit frame sequence number of the RLP frame in the segment buffer 146. When transmitting a new data frame, the RLP controller 131 performs the frame segment transmission procedure on the remaining frame segment stored in the segment buffer 146. After transmitting the remaining frame segment, the RLP controller 131 sets the value of the V(SS) register 141 to 0 and the value of the L_V(S) register 132 to the remainder of dividing (the L_V(S) register value+1) by $2^{12}$.

Reception of Control Frame in RLP Controller

The MUX/DEMUX controller 140 informs the RLP controller 131 of the size T of a received RLP frame, transmitting the RLP frame to the RLP controller 131.

Upon receipt to a SYNC, SYNC/ACK, or ACK frame, the RLP controller 131 performs the initialization operation. Upon receipt of a NAK frame, the RLP controller 131 interprets the NAK frame referring to Table 4. First, the RLP controller 131 forms a 12-bit sequence number using L_SEQ_HI of the NAK frame as the upper 4 bits and SEQ of the NAK frame as the lower 8 bits. Since the sequence number is the value of the L_V(N) register 136 in the receiver, the RLP controller 131 can delete retransmission entries with frame sequence numbers lower than the value of the L_V(N) register 136 from the forward resequencing buffer 133.

The RLP controller 131 can detect the number of frame retransmission requests and the number of frame part retransmission requests in the received NAK frame based on NAK_FRM_COUNT and NAK_SEQ_COUNT.

The RLP controller 131 performs the following procedure on each of (NAK_FRM_COUNT+1) frame retransmission requests included in the received NAK frame.

(1) The frame sequence number L_SEQ of a frame requested to be retransmitted is set as FIRST of its frame retransmission request.

(2) An RLP frame with a 12-bit frame sequence number identical to the frame sequence number L_SEQ is searched for in the forward resequencing buffer 133. If the RLP frame exists in the forward resequencing buffer 133, a copy of the RLP frame is stored in the retransmission request queue 134 along with its 12-bit frame sequence number.

(3) If L_SEQ is equal to LAST of the frame retransmission request, then the procedure ends. Otherwise, L_SEQ is updated to the remainder of dividing (the L_SEQ value+1) by $2^{12}$ and the above procedure is repeated.

The RLP controller 131 performs the following procedure on each of (NAK_SEQCOUNT+1) frame part retransmission requests included in the received NAK frame.

(1) The sequence number L_SEQ of a frame requested to be retransmitted is set as NAK_SEQ of its frame part retransmission request.

(2) An RLP frame with a 12-bit frame sequence number identical to the frame sequence number L_SEQ is searched for in the forward resequencing buffer 133. If the RLP frame exists in the forward resequencing buffer 133, then segmented data frames are formed out of data with FIRST_SEQ and LST_SEQ of the retransmission request as its data sequence numbers. A segmented data frame is constructed by the use of the lower 8 bits of the frame sequence number of the RLP frame and the data sequence number of the first byte of the data. The RLP controller 131 stores the segmented frame in the retransmission request queue 134 along with the 12-bit frame sequence number of the RLP frame.

Reception of Data Frame in RLP Controller

The MUX/DEMUX controller 140 transmits the size T of a received RLP frame along with the RLP frame to the RLP controller 131.

Upon receipt of a new data frame, the RLP controller 131 computes the 12-bit sequence number L_SEQ of the received new data frame using the 12-bit value of the L_V(R) register 135 and SEQ of the received new data frame by $$L\_SEQ = [L\_V(R) + \{2^8 + SEQ - (L\_V(R) \bmod 2^8)\} \bmod 2^8] \bmod 2^{12} \quad (1)$$

In case the RLP controller 131 receives a retransmission data frame, it should refer to the NAK list 138 shown in FIG. 6. Each NAK entry in the NAK list 138 includes L_SEQ (the 12-bit frame sequence number of a lost frame), FISRT_S_SEQ (the 12-bit data sequence number of the first byte of data), LAST_S_SEQ (the 12-bit data sequence number of the last byte of the data), RECEIVED (an indicator indicating whether a whole frame has been received), REXMIT_TIMER (retransmission timer), and ROUND_COUNTER (round counter). The RLP controller 131 searches for a NAK entry equal to the value of the 8-bit SEQ field of the received retransmission frame in the NAK list 138. If such a NAK entry exists, then the RLP controller 131 makes the frame sequence number stored in the NAK entry the frame sequence number L_SEQ of the received frame. If there is no such NAK entry, then the RLP controller 131 discards the received frame.

The RLP controller 131 processes the received frame utilizing the frame sequence number L_SEQ, data sequence number S_SEQ, and LAST of the received frame. If the received frame is not a segmented data frame but an unsegmented data frame, the RLP controller 131 considers the data sequence number S_SEQ to be "0" and the last segment indicator LAST to be "1". If the received frame is a segmented data frame, the RLP controller 131 determines the data sequence number S_SEQ to be the value of the field S_SEQ of the received frame and the last segment indicator LAST to be the value of the field LAST of the received frame. The RLP controller 131 processes the received segmented and unsegmented data frames in the same manner as described below.

If the RLP controller 131 receives a new data frame, then it performs the following operation.

(1) If the RLP controller 131 considers that the received frame is a delayed frame, then it processes the received frame like a retransmission frame.

(2) If the sequence number (L_SEQ, S_SEQ) of the received frame is <the value of the L_V(R) register 135, the value of the V(RS) register 142>, then the RLP controller 131 increases the value of the V(RS) register 142 by the number of the received data bytes. If LAST of the received frame is 1, the RLP controller 131 sets the value of the V(RS) register 142 to "0" and the value of the L_V(R) register 135 to the remainder of dividing (the value of the L_V(R) register 135+1) by $2^{12}$. If LAST is 1 and the value of the L_V(R) register 135 before it is incremented by 1 is equal to the value of the L_V(N) register 136, then the RLP controller 131 sets the value of the L_V(N) register 136 to the remainder of dividing (the value of the L_V(N) register 136+1) by $2^{12}$ and stores the received data in the reception data buffer 124. In this case, the data frame has been received normally. If the value of the L_V(R) register 135 before it is incremented by 1 is different from the value of the L_V(N) register 136, then the RLP controller 131 stores the received frame in the rearranging buffer 138. In this case, the data frame has not been received normally and thus a retransmission frame is awaited.

(3) If the sequence number (L_SEQ, S_SEQ) of the received frame is larger than <the value of the L_V(R) register 135, then the value of the V(RS) register 142>, the RLP controller 131 forms a NAK entry for data or a frame with <the value of the L_V(R) register 135, the value of the V(RS) register 142> ≦ first sequence number <(L_SEQ, S_SEQ). In the NAK entry, L_SEQ is set to a frame sequence number, FIRST_S_SEQ to the data sequence number of the first byte of each data, LAST_S_SEQ to the data sequence number of the last byte of each data, RECEIVED to 0, and ROUND_COUNTER to a predetermined value. The RLP controller 131 sets the value of the V(RS) register 142 by (the data sequence number S_SEQ+the number of the bytes of the received data). If LAST of the received segmented frame is 1, then the RLP controller 131 sets the value of the V(RS) register 142 to 0 and the value of the L_V(R) register 135 to the remainder of dividing (the value of the L_V(R) register 135+1) by $2^{12}$ and stores the received data in the rearranging buffer 139.

If the RLP controller 131 receives a retransmission data frame, then it performs the following operation.

(1) If the sequence number (L_SEQ, S_SEQ) of the received frame is less than <the value of the L_V(N) register 136, the value of the V(NS) register 143> and the received data does not include data represented by <the value of the L_V(N) register 136, the value of the V(NS) register 143>, then the RLP controller 131 discards the received frame.

(2) If the sequence number (L_SEQ, S_SEQ) of the received frame is greater than or equal to <the value of the L_V(N) register 136, the value of the V(NS) register 143>, then the RLP controller 131 discards the received frame.

(3) If the received data includes data represented by <the value of the L_V(N) register 136, the value of the V(NS) register 143>, then the RLP controller 131 stores data having <the value of the L_V(N) register 136, the value of the V(NS) register 143> as a first sequence number and the data sequence number of the last byte of the received data as a last sequence number in the reception data buffer 124. The RLP controller 131 sets the value of the V_(NS) register 146 to (the data sequence number of the last byte of the received data+1). If LAST of the received frame is 1, then the RLP controller 131 sets the value of the V(NS) register 146 to 0 and the value of the L_V(N) register 136 the remainder of dividing (the value of the L_V(N) register 136+1) by $2^{12}$. The RLP controller 131 repeats the retransmission frame receiving procedure for the retransmission frames stored in the rearranging buffer 139 in the order of their sequence numbers. If no retransmission frame stored in the rearranging buffer 139 includes a frame with <the value of the L_V(N) register 136, the value of the V(NS) register 143>, then the above procedure ends.

(4) If the sequence number <L_SEQ, S_SEQ> is greater than <the value of the L_V(N) register 136, the value of the V(NS) register 143>, then the RLP controller 131 stores the received frame in the rearranging buffer 139.

Then, the RLP controller 131 performs the following operation for each NAK entry.

(1) If L_SEQ in the NAK entry is different from the frame sequence number L_SEQ of the received frame, then the RLP controller 131 leaves the NAK entry unchanged. Only if L_SEQ in the NAK entry is equal to the frame sequence number L_SEQ of the received frame, the following steps are implemented.

(2) The RLP controller 131 calculates the data sequences of the first and last bytes of the received data, that is, F_S_SEQ and L_S_SEQ. F_S_SEQ is the data sequence number S_SEQ of the received frame and L_S_SEQ is the data sequence number of the last byte of the received frame. If LAST of the received frame is 1, then L_S_SEQ is ($2^{12}$-1).

(3) If data represented by FIRST_S_SEQ and LAST_S_SEQ of the NAK entry is included in the received data, then the RLP controller 131 sets RECEIVED to 1.

(4) If all of the data represented by FIRST_S_SEQ and LAST_S_SEQ of the NAK entry is not included in the received data, then the RLP controller 131 forms different NAK entries for the included data and the non-included data. That is, L_SEQ is set to the frame sequence number of the received frame, FIRST_S_SEQ and LAST_S_SEQ are set to appropriate values for each data, RECEIVED is set to 1 for the included data and to 0 for the non-included data, REXMIT_TIMER is set to the same value of REXMIT_TIMER of the NAK entry, and ROUND_COUNTER is set to a predetermined value. The RLP controller 131 deletes the existing NAK entry.

(5) If any of the data represented by FIRST_S_SEQ and LAST_S_SEQ of the NAK entry is not included in the received data, then the RLP controller 131 renders the NAK entry unchanged.

Reception of Idle/Intersegment Fill Frame in RLP Controller Upon receipt of an idle frame or an intersegment fill frame, the RLP controller 131 obtains the 12-bit frame sequence number L_SEQ of the received frame by combining the L_SEQ_HI value of the received frame as the upper 4 bits and the SEQ value as the lower 8 bits.

The RLP controller 131 operates for the received idle/intersegment fill frame in the following manner.

(1) If the frame sequence number L_SEQ of the received frame is larger than the value of the L_V(R) register 135, then the RLP controller 131 makes NAK entries for all frames with the value of the L_V(R) register 135<frame sequence numbers ≦(L_SEQ-1) modulo $2^{12}$. L_SEQ of each NAK entry is set to the frame sequence number of a corresponding frame, FIRST_S_SEQ to 0, LAST_S_SEQ to ($2^{12}$-1), RECEIVED to 0, and ROUND_COUNTER to a predetermined value.

(2) If the frame sequence number L_SEQ of the received frame is less than the value of the L_V(R) register 135, then the RLP controller 131 performs the initialization operation.

Reception of Damaged Frame in RLP Controller

Informed of receipt of a damaged RLP frame by the MUX/DEMUX controller 140, the RLP controller 131 increases the value of the E register 137 by 1. If the increases E register value is larger than 255, then the RLP controller 131 performs the initialization operation.

If there exists a normally received RLP frame during data reception, the RLP controller 131 sets the value of the E register 137 to 0.

Amendment of NAK List in RLP Controller

After processing all frames received for a predetermined time period, the RLP controller 131 determines whether a retransmission request is to be issued for each NAK entry of the NAK list 138 or it will await no more retransmission in the following way.

In the present invention, the process of requesting a retransmission to the RLP frame transmitter and awaiting reception of a retransmission data frame by the RLP frame receiver is defined as "one round". One round is terminated a predetermined time after transmission of a NAK frame including a retransmission request or when a requested frame arrives. A retransmission request can be transmitted across a plurality of successive NAK frames in one round.

A base station RLP determines whether after several rounds, the RLP frame receiver should give up data reception or how many NAK frames will be used to transmit a retransmission request in each round.

Every time the RLP controller 131 receives RLP frames, it stores an RLP frame with the highest sequence number in the R_L_SEQ register 144. The RLP controller 131 stores the data sequence number of the first byte of an RLP frame with a frame sequence number equal to the value of the R_L_SEQ register 144 in the R_S_SEQ register 145. If a plurality of RLP frames have frame sequence numbers equal to the value of the R_L_SEQ register 144, the RLP controller 131 stores the highest of the data sequence numbers of the first bytes of the RLP frames. For example, if the received frame is an unsegmented data frame with a frame sequence number equal to the value of the R_L_SEQ register 144, then 0 is stored in the R_S_SEQ register 145. If received frames with frame sequence numbers equal to the value of the R_L_SEQ register 144 are all segmented frames, then the highest of S_SEQ field values of the segmented frames is stored in the R_S_SEQ register 145.

The RLP controller 131 performs the following operation for all the NAK entries of the NAK list 138, starting with the oldest NAK entry.

(1) If REXMIT_TIMER of the NAK entry is larger than 0 and data designated by the NAK entry is included in as many NAK frames as the base station RLP determines for a current round, then the RLP controller 131 compares the sequence number <L_SEQ, FIRST_S_SEQ> of the NAK entry with <the value of the R_L_SEQ register 144, the value of the R_S_SEQ register 145>. If <L_SEQ, FIRST_S_SEQ> is less than <the value of the R_L_SEQ register 144, the value of the R_S_SEQ register 145>, then the RLP controller 131 decreases REXMIT_TIMER by 1.

(2) If the decreased REXMIT_TIMER is 0, then the RLP controller 131 decreases ROUND_COUNTER of the NAK entry by 1. If RECEIVED of the NAK entry is 1, then the RLP controller 131 deletes the NAK entry from the NAK list 138.

(3) On the other hand, if RECEIVED is 0 and ROUND_COUNTER is 0, then the RLP controller 131 considers that an awaited frame has not been received and sets the value of the V(NS) register 143 to (LAST_S_SEQ+1). If the value of V(NS) register 143 is 0, then the RLP controller 131 sets the value of the L_V(N) register 136 to the remainder of dividing (the value of the L_V(N) register 136+1) by $2^{12}$. The RLP controller 131 performs the retransmission frame receiving procedure for frames stored in the rearranging buffer 139. If there is no frame that includes data represented by <the value of the R_L_SEQ register 144, then the value of the R_S_SEQ register 145> in the rearranging buffer 139, the above procedure ends.

(4) If RECEIVED of the NAK entry is 0 and ROUND_COUNTER is not 0, then the RLP controller 131 sets REXMIT_TIMER of the NAK entry to a value larger than 0 and includes the data designated by the NAK entry in as many frames as designated by the base station RLP for a current round.

The RLP controller 131 performs the following operation for all NAK entries whose REXMIT_TIMER values are not set in the NAK list 138.

(1) The RLP controller 131 sets ROUND_COUNTER of the NAK entry to a value set by the base station RLP controller.

(2) REXMIT_TIMER of the NAK entry is set to a value larger than 0 and the data designated by the NAK entry is included in as many NAK frames as designated by the base station RLP.

As described above, the present invention provides a more rapid data retransmission method than the conventional one to efficiently transmit data. Therefore, the transmission efficiency of the RLP is increased.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of requesting frame retransmission in a mobile communication system, comprising the steps of:
storing a sequence numbers of a plurality of RLP (Radio Link Protocol) frames that are not received from a transmitter in a receiver;
transmitting a retransmission request frame including fields that indicate the sequence numbers stored in the receiver;
sequentially receiving the requested RLP frames in the order of the sequence numbers from the transmitter in the receiver; and
comparing the stored sequence numbers with the sequence numbers of received RLP frames when if the receiver fails to receive one of the requested RLP frames, requesting retransmission of the lost RLP frame upon receipt of an RLP frame of a higher sequence number than the sequence number of the lost RLP frame.

2. A mobile communication system comprising:
a transmitter for transmitting a plurality of RLP (Radio Link Protocol) frames each having a sequence number; and
a receiver for receiving the plurality of RLP frames,
wherein the receiver transmits a retransmission request frame including fields that indicate the sequence numbers of non-received RLP frames, the transmitter sequentially transmits the requested RLP frames along with the sequence numbers of the requested RLP frames in the order of the sequence numbers to the receiver upon receipt of the retransmission request frame, and if the receiver fails to receive one of the requested RLP frames, the receiver RLP transmits a retransmission request frame for the RLP frame the receiver failed to receive upon receipt of an RLP frame of a higher sequence number than the sequence number of the lost RLP frame.

3. A mobile communication system comprising:
a transmitter for transmitting a plurality of RLP (Radio Link Protocol) frames each having a sequence number, and sequentially transmitting to a receiver requested RLP frames along with sequence numbers of a requested RLP frames in the order of the sequence numbers upon receipt of a retransmission request frame; and
a receiver for receiving the plurality of RLP frames, transmitting a first retransmission request frame including fields that indicate the sequence numbers of non-received RLP frames upon receipt of an RLP frame of a higher sequence number than the sequence number of the non-received RLP frame, and transmitting a second retransmission request frame if the receiver fails to receive one of the requested RLP frames.

* * * * *